US010429000B2

(12) United States Patent
Dickinson et al.

(10) Patent No.: US 10,429,000 B2
(45) Date of Patent: Oct. 1, 2019

(54) MAGNETIC BRACKET AND METHOD

(71) Applicants: Daniel James Dickinson, Lincolnshire, IL (US); Michael Walter Smith, Lake Zurich, IL (US)

(72) Inventors: Daniel James Dickinson, Lincolnshire, IL (US); Michael Walter Smith, Lake Zurich, IL (US)

(73) Assignee: TERMAX LLC, Lake Zurich, IL (US)

( * ) Notice: Subject to any disclaimer, the term of this patent is extended or adjusted under 35 U.S.C. 154(b) by 141 days.

(21) Appl. No.: 13/831,525

(22) Filed: Mar. 14, 2013

(65) Prior Publication Data

US 2014/0263895 A1 Sep. 18, 2014
US 2016/0334053 A9 Nov. 17, 2016

Related U.S. Application Data

(63) Continuation-in-part of application No. 12/983,010, filed on Dec. 31, 2010, now Pat. No. 8,287,034, which is a continuation-in-part of application No. 12/464,867, filed on May 13, 2009, now Pat. No. 8,615,852.

(51) Int. Cl.
*F16M 13/02* (2006.01)
*B60R 13/02* (2006.01)
*F16B 5/12* (2006.01)
*F16B 1/00* (2006.01)

(52) U.S. Cl.
CPC ......... *F16M 13/02* (2013.01); *B60R 13/0206* (2013.01); *F16B 5/123* (2013.01); *F16B 2001/0035* (2013.01); *Y10T 29/49959* (2015.01)

(58) Field of Classification Search
CPC . B60R 13/0206; B60R 13/0218; B60R 13/02; B62D 65/14; B62D 25/06
USPC ................................ 248/206.5, 224.8, 225.11
See application file for complete search history.

(56) References Cited

U.S. PATENT DOCUMENTS

| 1,523,042 | A | * | 1/1925 | Thomas ..................... 248/537 |
| 2,787,435 | A | * | 4/1957 | Shields ................ A47G 1/1686 |
| | | | | 16/87.2 |
| 2,940,361 | A | | 6/1960 | Francisco |
| 3,025,559 | A | | 3/1962 | Basinger |
| 3,244,443 | A | | 4/1966 | Rodgers |

(Continued)

FOREIGN PATENT DOCUMENTS

| GB | 1056797 | 1/1967 |
| JP | 53-4919 | 1/1978 |

(Continued)

*Primary Examiner* — Anita M King

(57) ABSTRACT

A magnetic bracket includes a base and at least two posts at opposite ends of the base. The posts bend upwards from the base such that at least two clips are operable to attach at the posts at opposite ends of the base. The posts have a notch between the base and ends of the posts to permit the clips to hook onto the posts. The magnetic bracket may be clipped into a vehicle chassis by removably inserting the clips into a slot of the vehicle chassis. A body panel such as a headliner having a magnetic fastener attached to the body panel may then be magnetically self-aligned and removably attached to the base having a magnetic portion. The magnetic fastener is operable to be removably attached to the magnetic portion. The magnetic bracket is attached to a non-magnetic part of a vehicle chassis.

16 Claims, 6 Drawing Sheets

(56) References Cited

U.S. PATENT DOCUMENTS

| | | | |
|---|---|---|---|
| 3,258,232 A * | 6/1966 | Nestegard | G09F 1/10 |
| | | | 248/206.5 |
| 3,261,631 A | 7/1966 | Alessi | |
| 3,300,239 A | 1/1967 | Dinkin | |
| 3,330,066 A | 7/1967 | Crawford | |
| 3,515,284 A * | 6/1970 | Taylor | A47B 96/067 |
| | | | 211/60.1 |
| 3,781,047 A | 12/1973 | Surko, Jr. | |
| 4,083,592 A * | 4/1978 | Rubin | B60R 13/04 |
| | | | 428/31 |
| 4,303,054 A | 12/1981 | Lore | |
| 4,516,296 A * | 5/1985 | Sherman | F16L 3/24 |
| | | | 24/20 LS |
| 4,825,526 A | 5/1989 | Shenier et al. | |
| 4,838,004 A * | 6/1989 | Adell | E04F 19/026 |
| | | | 293/128 |
| 4,907,769 A | 3/1990 | Hunley, Jr. et al. | |
| 5,042,867 A | 8/1991 | Crotty et al. | |
| 5,078,281 A * | 1/1992 | Johnson | 211/88.01 |
| 5,082,317 A | 1/1992 | Delaney, Jr. | |
| 5,187,744 A | 2/1993 | Richter | |
| 5,280,991 A | 1/1994 | Weiland | |
| 5,353,571 A * | 10/1994 | Berdan et al. | 52/716.5 |
| 5,385,161 A * | 1/1995 | Loker et al. | 135/15.1 |
| 5,687,945 A | 11/1997 | Lee | |
| 5,983,464 A | 11/1999 | Bauer | |
| 6,644,713 B2 * | 11/2003 | Del Pozo Abejon et al. | |
| | | | 296/39.1 |
| 6,857,809 B2 | 2/2005 | Granata | |
| 6,895,642 B2 | 5/2005 | Huang | |
| 7,217,059 B1 | 5/2007 | Rudduck | |
| 7,241,069 B2 | 7/2007 | Richter | |
| 7,306,190 B2 | 12/2007 | Tisol, Jr. | |
| 7,435,031 B2 | 10/2008 | Granata | |
| 7,549,779 B2 * | 6/2009 | Genenbacher | 362/398 |
| 7,849,567 B2 * | 12/2010 | Dickenson et al. | 24/293 |
| 8,146,872 B2 * | 4/2012 | Koning et al. | 248/206.5 |
| 8,230,987 B2 * | 7/2012 | Vezzosi et al. | 193/17 |
| 8,287,034 B2 * | 10/2012 | Smith et al. | 296/191 |
| 8,555,468 B2 * | 10/2013 | Moerke | 24/303 |
| 9,428,226 B2 * | 8/2016 | Joyce | B60R 13/0206 |
| 2006/0127172 A1 | 6/2006 | Tisol, Jr. | |
| 2006/0168773 A1 * | 8/2006 | Smith et al. | 24/295 |
| 2010/0026028 A1 * | 2/2010 | Smith et al. | 296/29 |
| 2012/0049013 A1 * | 3/2012 | Klein | H02G 3/32 |
| | | | 248/74.1 |
| 2012/0069587 A1 * | 3/2012 | Holland | 362/396 |
| 2014/0001322 A1 * | 1/2014 | Joyce et al. | 248/206.5 |

FOREIGN PATENT DOCUMENTS

| | | |
|---|---|---|
| JP | 59-145860 | 8/1984 |
| JP | 62-152945 | 7/1987 |
| JP | 6-6116 | 1/1994 |
| JP | 06-228507 | 8/1994 |
| JP | 08-132981 | 5/1996 |
| JP | 09-264306 | 10/1997 |
| JP | 10-131926 | 5/1998 |
| JP | 11-178172 | 7/1999 |
| JP | 2002-059793 | 2/2002 |

* cited by examiner

MAGNETIC BRACKET AND METHOD

RELATED APPLICATIONS

This is a continuation in part application claiming priority from an application entitled "Magnetic Fastener Clip" having a Ser. No. 12/464,867, and having a filing date of May 13, 2009, the entire disclosure of which is incorporated herein by reference.

This is a continuation in part application claiming priority from an application entitled "CONTINUOUSLY ADAPTIVE FASTENER CLIP" having a Ser. No. 12/651,477, having a filing date of Jan. 3, 2010;

which is a continuation in part of an application entitled, "CONTINUOUSLY ADAPTIVE FASTENER CLIP" having a Ser. No. 12/534,119, having a filing date of Aug. 1, 2009;

which is a continuation in part of an application entitled "CONTINUOUSLY ADAPTIVE FASTENER CLIP" having a Ser. No. 11/870,412, having a filing date of Oct. 10, 2007;

which is a continuation in part of an application entitled "Multicontact Adaptive Fastener Clip" having a Ser. No. 11/277,107, having a filing date of Mar. 21, 2006; and which is a continuation in part of U.S. patent application Ser. No. 10/906,209, now U.S. Pat. No. 7,178,850 filed on Feb. 9, 2005, the entire disclosures of which are incorporated herein by reference in their entirety.

FIELD OF THE INVENTION

The invention relates generally to devices for fastening objects, and more particularly to a magnetic fastener and/or clip for insertion into or attachment onto an engagement structure, such as a vehicle chassis, a hollow substrate, a wall, a plate or any suitable surface.

BACKGROUND OF THE INVENTION

A number of devices and fasteners are currently available for fastening panels such as body panels and automobile interior trimpiece panels to the chassis of a vehicle. Fastener clips are used in automobile assemblies to secure body panels such as headliners, pillar covers, interior panels and the like to roofs, door structures and body pillars. An example of such a clip is described in U.S. Pat. No. 7,444,721 incorporated by reference. As used herein, a body panel refers to, for example, any interior or exterior structure attached to a vehicle, such as a plastic or metal interior trim piece or any interior trimpiece. The body panel may be any suitable exterior body panel, such as a fender, bumper, quarter panel or door panel. The chassis of the vehicle may include any substrate, roof, plate, body panel, structural framework, chassis component or subcomponent, support component, wall or any suitable object or combination.

Interior automobile fasteners, such as screws, are also known to retain a body panel to a vehicle chassis. For example, a screw may attach a headliner in position within the automobile roof. However, many of these fasteners only fasten around the periphery of the headliner. While a dome light or the like may be located in the middle of the roof area, extensive expanses of the headliner are not supported or fastened by such structures. Also, these fasteners allow the headliner to sag, providing an aesthetically unacceptable appearance.

An automobile body panel such as a headliner or B pillar cover is typically made of cloth, foam, plastic or other suitable material and generally includes a suitable substrate layer. A fastener clip may be secured to the substrate by an adhesive, such as glue, and is then attached to the underlying roof structure.

Attaching the headliner to the interior of the roof typically requires securing clips already fastened to a headliner assembly into a hole, slot or mounting point on the roof. At least some of the clips require blind insertion and installation of the fasteners because the installer is not able to view the fastener clip or the mounting point on the roof.

Fastener clips are also known for attaching body panels to an automobile chassis. Magnets may be used to reduce the problem of the blind fastener application. For example, fastener clips are known that attach to an automobile headliner or the like using adhesive, and which firmly connects to a magnet. Thus, magnetic fastening clips do not require aligning a fastener with a mating hole and attachment of the fastener to the hole.

Another known clip has a base, a dome spaced from the base and a plurality of supports between the base and the dome. A hollow post extends outwardly from the dome and includes at least one deflectable portion having an outward protuberance thereon. A pin is substantially aligned with the post and connected thereto by at least one frangible link. A frangible link between the pin and the clip is adapted to rupture when the pin is driven. However, since the pin requires alignment and insertion during manufacture, assembly is time consuming labor intensive and expensive.

These known clips however are difficult to install especially in a blind manner and are neither sufficiently rugged nor flexible for example on an electrical box, conduit or automobile assembly line that can be somewhat harsh. These fastening clips typically do not have a long useful life to support the headliner or cables and prevent staking throughout the anticipated life expectancy of the vehicle. During installation the headliner can be moved, stretched or twisted inconsistently. However, the fastener device is typically required to secure the panel to the chassis that may have sheet metal with different amounts of curvature or thicknesses throughout. If the sheet metal varies in curvature or thickness or if for example, tolerances in production of the vehicle chassis or in the trim-piece, i.e. headliner exist, then engagement of one fastener to the roof may not provide suitable magnetic engagement or will otherwise result in movement. Further, less than all these fasteners typically make engagement with the chassis. Twisting of the body panel will be likely more prevalent because less than all contact points are actually made with the roof. As a result, sagging, wear, squeaks, rattles, buzzing, corrosion and loss of elasticity and loss of sealing may result, especially after years of vehicle operation and exposure to vibration and other environmental conditions. As such, these fastener clips do not provide sufficient flexibility.

Once installed, during use of the automobile, the headliner is sometimes contacted or pushed by passengers. The fastener device is typically required to secure the headliner under a variety of environmental conditions, such as in the presence of vibration at various levels of amplitude and frequency. Further, the fastener device should prevent or minimize the amount of buzzing, rattling or any other type of noise that may cause attention to the occupants of the vehicle or otherwise weaken the attachment. Further yet, another requirement of the fastener device is that the fastener device accommodates various levels of sheet metal curvature, thicknesses, and production tolerances, such as various dimensions amongst, for example, the body panels as well as the vehicle chassis. Conventional fastener devices typically do not adequately fasten to a range of sheet metal thicknesses and do not minimize or eliminate buzzing and rattling and do not sufficiently accommodate variations in production tolerances. As a result, these clips do not properly fasten the body panel to the chassis, break or otherwise fail under these conditions. If the fastener clip is broken after installation of the body panel, sagging can occur again presenting the aesthetically undesirable appearance. Further, replacement of an installed, broken clip can be difficult.

BRIEF DESCRIPTION OF THE DRAWINGS

FIG. 6 is a bottom perspective view of the magnetic bracket and assembly.

DETAILED DESCRIPTION OF THE PREFERRED EMBODIMENTS

Figure 1A:
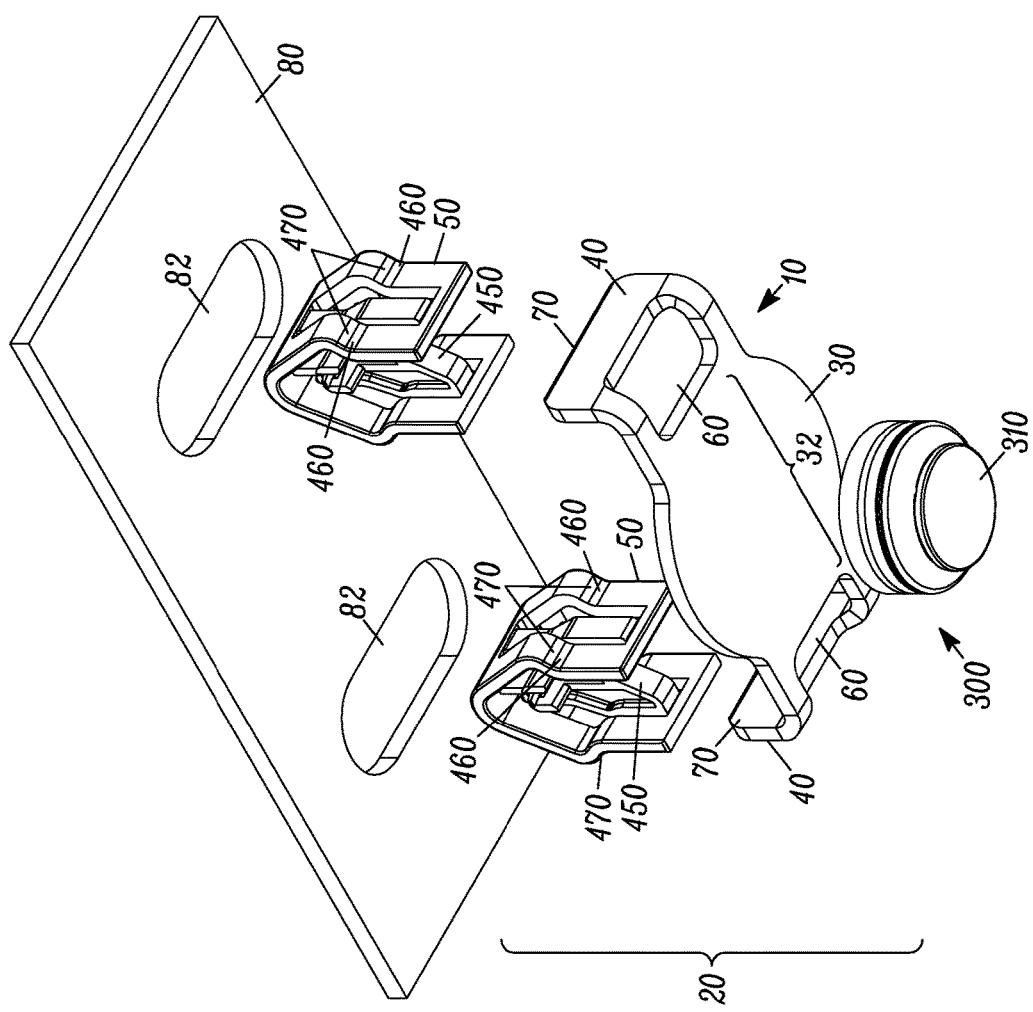
FIG. 1 is an exploded view of a magnetic bracket and assembly according to one embodiment.

A magnetic bracket includes a base and at least two posts at opposite ends of the base. The posts bend upwards from the base such that at least two clips are operable to attach at the posts at opposite ends of the base. The posts have a notch between the base and the posts to permit the clips to hook onto the posts. The magnetic bracket may be clipped into a vehicle chassis by removably inserting the clips into a slot of the vehicle chassis. A body panel such as a headliner having a magnetic fastener attached to the body panel may then be magnetically self-aligned and removably attached to the magnetic portion of the base. The magnetic fastener is operable to be removably attached to the magnetic portion. The magnetic bracket may thus be attached to a non-magnetic part of a vehicle chassis. For example, the non-magnetic part of a vehicle chassis may be carbon fiber, fiber glass, or aluminum and permits body panels to be attached to the chassis via the magnetic bracket.

Among other advantages, the magnetic bracket is attached to a chassis or a portion of the chassis which may not be magnetic. For example, the chassis or a portion of the chassis may be carbon fiber, fiber glass, or aluminum or any suitable non-magnetic material. The magnetic bracket permits body panels to be easily attached to the chassis via the magnetic bracket even in blind engagement conditions.

The magnetic fastener bracket relatively easily facilitates attachment of a body panel with the non-magnetic portion of the chassis, such as the vehicle door frame, roof, sun-roof section, instrument panel structure, pillar, such that a single style adjustable magnetic fastener and/or bracket may be used with different depth attachment requirements, sheet metal curvatures and/or thicknesses. For example, a vehicle roof, pillar, instrument panel structure, chassis, or door may have different sheet metal curvatures and thicknesses at various parts of the vehicle. Since the fastener adapts automatically to different attachment requirements, depths, sheet metal curvatures and thicknesses, the same style fastener clip may be used throughout the vehicle thus eliminating the need for specific fastener clips for different parts of the roof and headliner that otherwise would require a clip according to specific roof curvatures and thicknesses. The body panel may be an automatable headliner, door panel, instrument panel, A, B, C, D, etc. pillar panel, bumper, fender, quarter panel, grill, hood, roof, trunk panel or any suitable interior or exterior panel.

The magnet bracket, along with an optional carrier, permits relatively easy insertion of the magnetic fastener clip into a vehicle chassis, pillar, instrument panel structure, door, roof and permits magnetic attachment and detachment with as suitable body panel while providing a relatively high level of extraction force from the body panel. According to one embodiment, if the roof is made of a non-magnetic material such as aluminum, carbon fiber or fiber glass, the magnets fastened to the headliner will not attach at incorrect points on the roof since the magnet is not attracted to aluminum. Among other advantages, as the headliner and magnet assembly nears the magnetic bracket, the magnet will automatically align and attach with the magnetic bracket making headliner assembly very easy, and significantly easier than conventionally possible. Assembly of the body panel onto the vehicle chassis is very easy and requires no or a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for blindly inserting the body panel into the vehicle chassis increases productivity and may result in fewer injuries to the assembly workers, including injuries related to repetitive stress syndrome. Further by selecting a single fastener or reducing the number of different fasteners for different sheet metal curvatures and thicknesses, confusion during assembly is eliminated since the same type or a reduced number of fasteners may be used for all or most body panel fasteners. Thus, an assembly worker need not worry about selecting the wrong fastener.

The relatively high level of extraction force, characteristic of the clip and magnetic fastener clip, securely attaches the body panel, such as a door panel, or headliner, to the vehicle chassis. Further, the fastener clip continuously adapts to changes in environmental conditions such as vehicle flexing, pushing by passengers, vibration and thermal expansion. For example, the magnetic fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip may be made of anti-corrosive material such as plastic or treated metal to provide long reliable service life.

Yet another advantage is that the magnetic fastener clip is relatively easy to manufacture using relatively inexpensive manufacturing processes and materials. The use of the magnetic fastener clip decreases production costs, increases worker productivity and efficiency, improves reliability and quality and decreases overall vehicle assembly, warranty and maintenance costs. The magnetic fastener securely attaches a body panel such as a door panel to a door frame, or headliner to the vehicle roof, such that the magnetic fastener clip improves reliability both in the short term and in the long term, while further improving vehicle safety and quality.

Figure 1B:
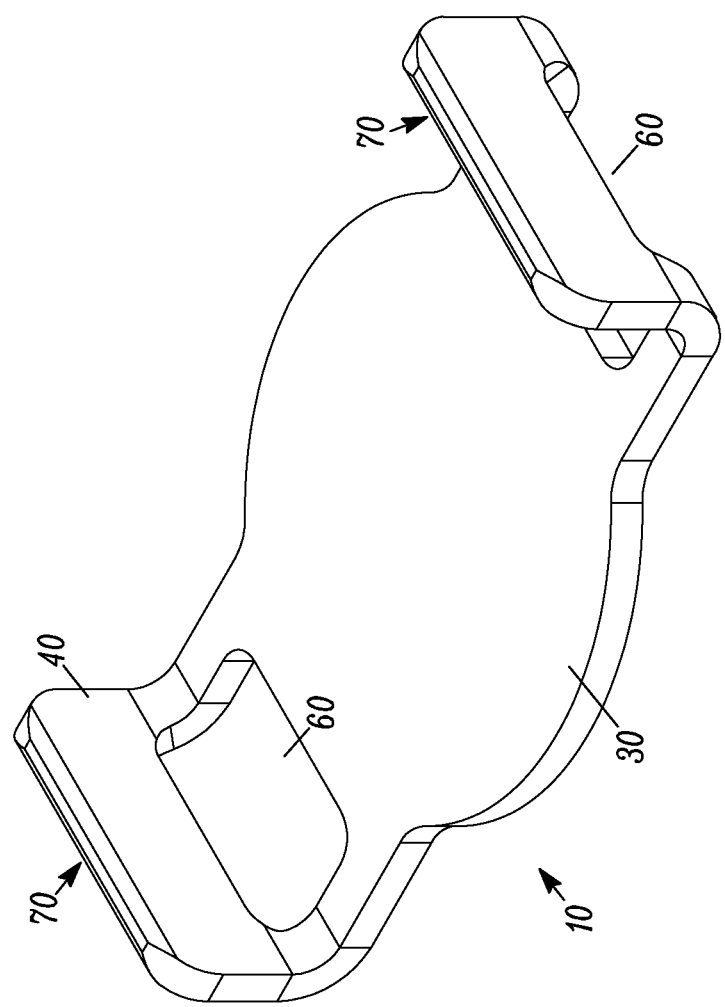

FIG. 1 is an exploded view of a magnetic bracket 10 and assembly 20 according to one embodiment. The magnetic bracket 10 includes a base 30 and at least two posts 40 at opposite ends of the base 30. The magnetic bracket 10 includes a magnetic portion 32 of the base 30 operable to attach to a magnetic fastener 300. The magnetic bracket 10 may be made of: steel, a steel alloy, iron, and a magnetic material and/or any suitable material.

Figure 2:
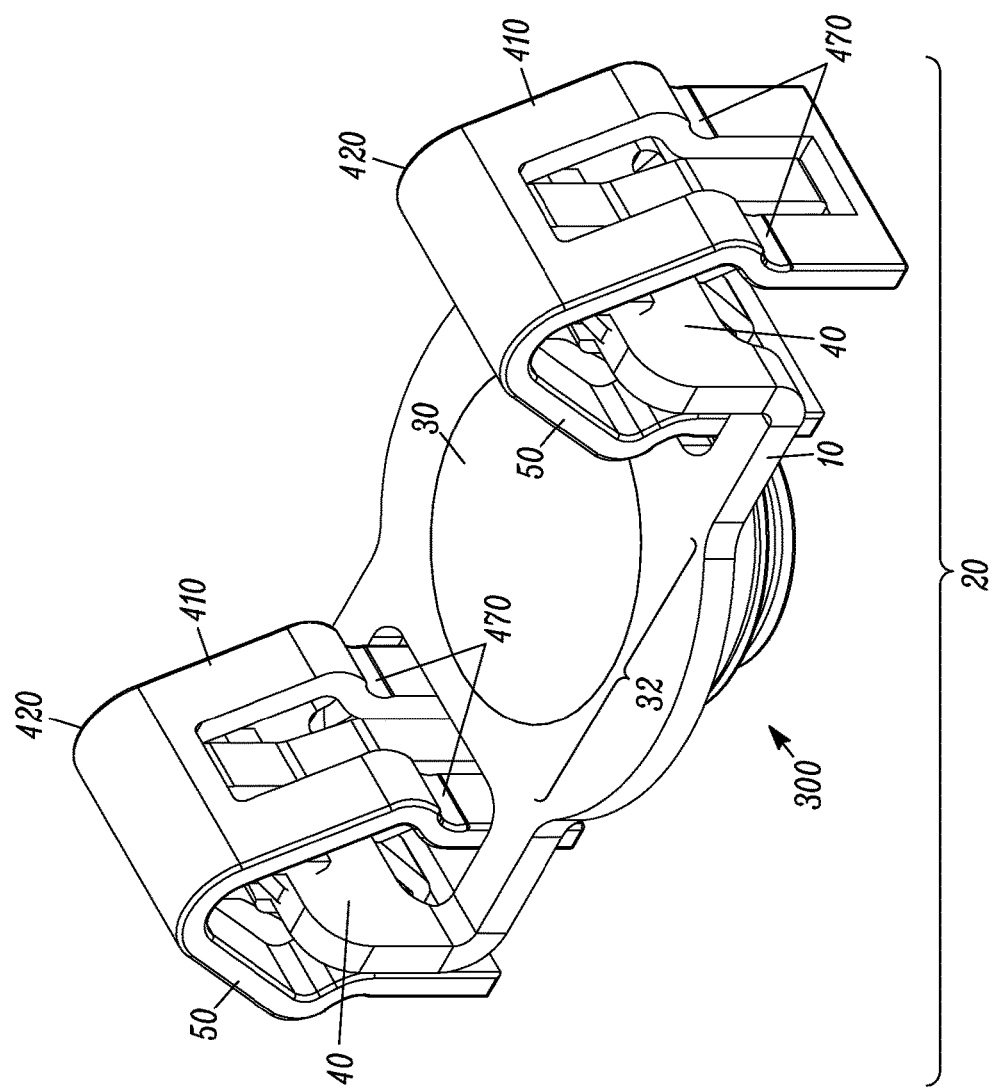
FIG. 2 is perspective view of the magnetic bracket according to one embodiment.

FIG. 2 is perspective view of the magnetic bracket 10 according to one embodiment. The posts 40 bend upwards from the base 30 such that at least two clips 50 are operable to attach at the posts 40 at opposite ends of the base 30. According to one embodiment, the ends of the posts 40 are tapered to guide the posts upon insertion into the clip opening 430. Further yet, the posts 40 may have a depression 70 to provide a desired retention force with clip arms 440, 470 as described in more detail below. As shown in FIGS. 1-6, the posts 40 have a notch 60 between the base 30 and ends of the posts 30 to permit the clips 50 to hook onto the posts 40 upon insertion. The notch 60 also permits the posts 40 to be bent precisely during manufacture. The magnetic bracket 10 may be clipped into a vehicle chassis 80 by removably inserting the clips 50 into a slot 82 of the vehicle chassis 80.

Figure 3:
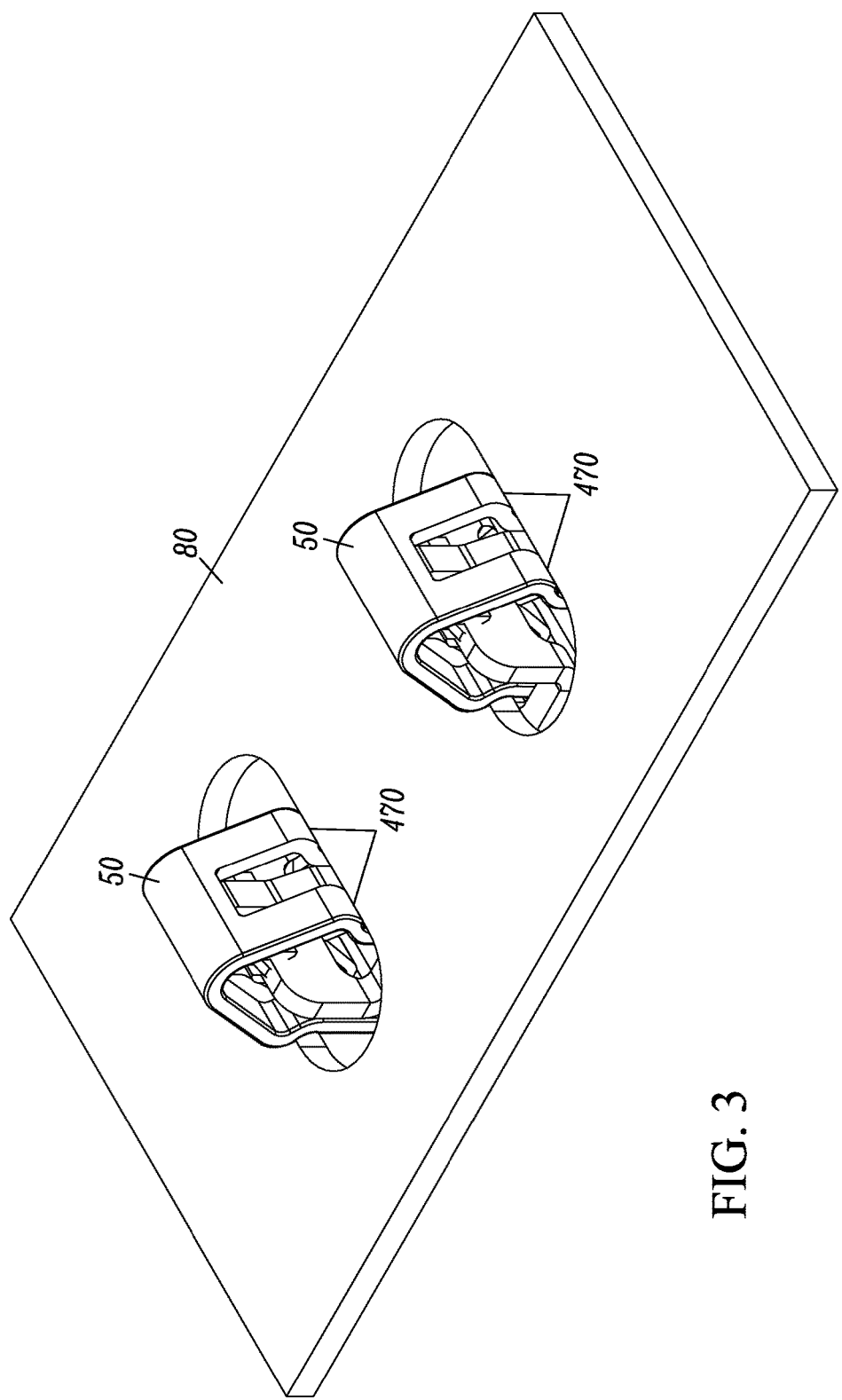
FIG. 3 is an assembly view of a magnetic bracket and assembly according to one embodiment.

FIG. 3 is an assembly view of a magnetic bracket 10 and assembly 20 according to one embodiment. A magnetic fastener 300 is attached to the body panel (not shown) and may then be magnetically self-aligned and removably attached to the magnetic portion 32 of the base 30. The magnetic fastener 300 is operable to be removably attached to the magnetic portion 32.

Figure 4:
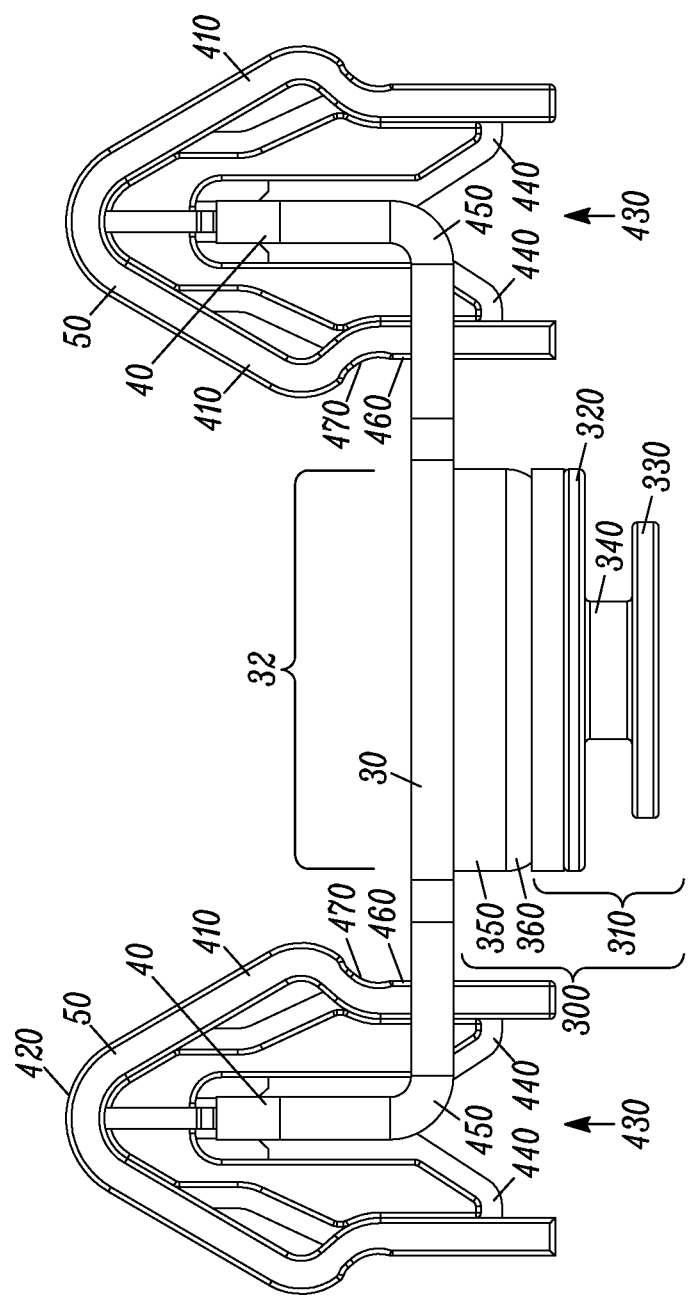
FIG. 4 is an assembly view of a magnetic bracket inserted into a vehicle chassis according to one embodiment.

FIG. 4 is an assembly view of the magnetic bracket 10 and assembly 20 inserted into a vehicle chassis 80 according to one embodiment. The magnetic bracket assembly 20 is attached via clips 50 to a non-magnetic part of the vehicle chassis 80. As shown best in FIGS. 2-6, the magnetic fastener 300 magnetically attaches to the magnetic portion 32 of the magnet bracket 30. For example, the magnetic portion 32 may have a round, circular, semicircular, rectangular or curved shape, or any shape or configuration suitable to magnetically attach to the magnetic fastener 300.

As the headliner and magnet fastener 300 nears the magnetic portion 32 of the magnetic bracket 10, magnetic force with the magnet fastener 300 and headliner will automatically align and attach with the magnetic bracket 10 making headliner assembly very easy, and significantly easier than conventionally possible. Assembly of the body panel onto the vehicle chassis is very easy and requires no or a relatively low level of insertion force compared to the extraction force, and as a result provides many ergonomic advantages. The non-magnetic part of a vehicle chassis 80 may be carbon fiber, fiber glass, or aluminum and permits body panels to be attached to the chassis via the magnetic bracket 10. Thus, as the headliner affixed with the various magnetic fasteners 300 is positioned into place with the roof, the magnetic fasteners 300 will not be attracted with the non-magnetic roof. As the magnetic fasteners 300 pass near the magnetic portion 32 of the magnetic bracket 10, the magnetic attraction will thus precisely align and firmly affix (snap) the entire headliner in proper position. Advantageously, the time consuming problem of moving a headliner with clips blindly into slots in the roof is eliminated since the magnetic fastener 300 does not pull into nonmagnetic areas of the roof, but rather substantially automatically self-aligns the headliner and magnetic fastener 300 into the bracket 10.

Figure 5:
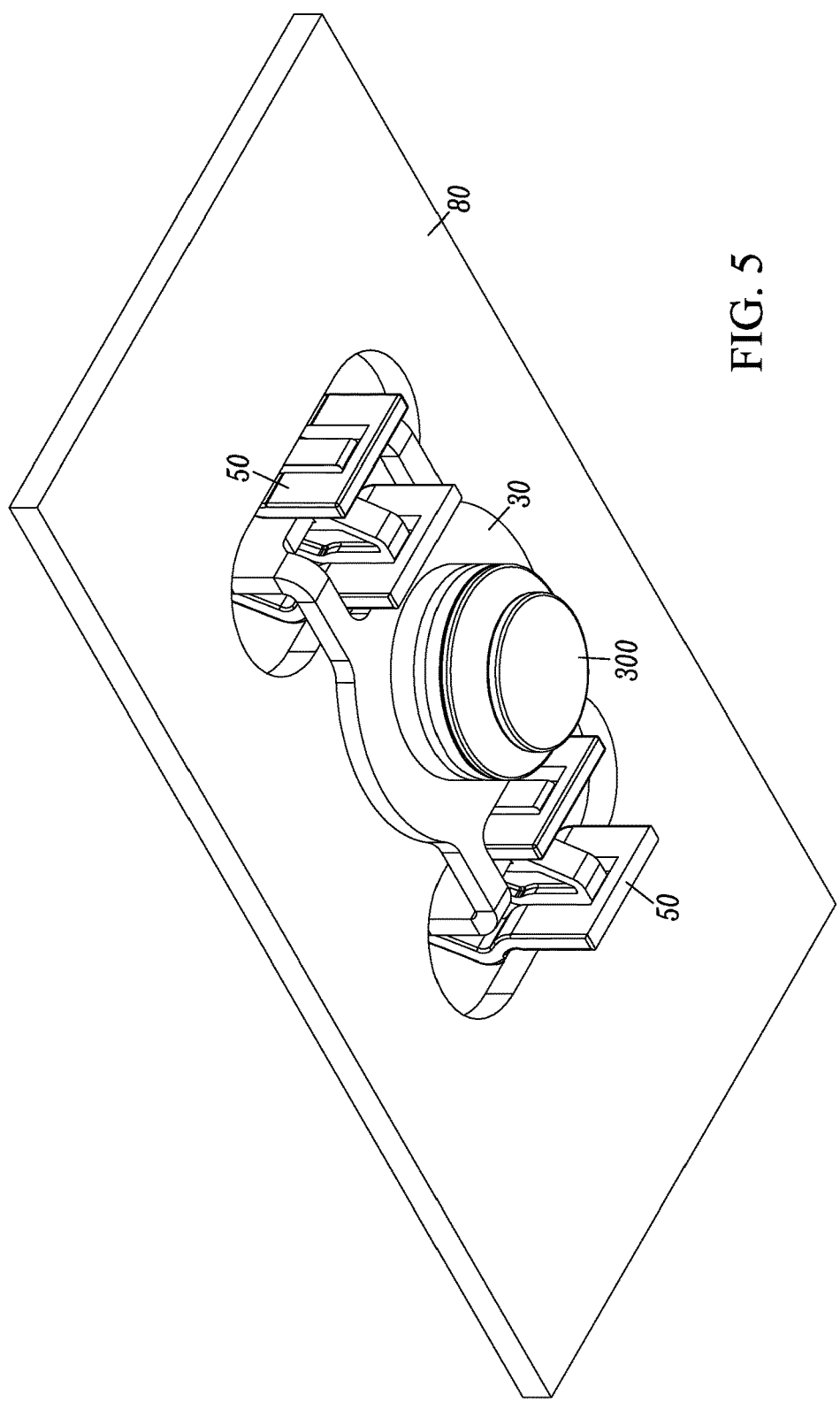
FIG. 5 is a side view of a magnetic bracket and assembly according to one embodiment.

FIG. 5 is a side view of a magnetic bracket 10 and assembly 20 according to one embodiment. The fastener clip 50 includes a pair of laterally offset legs 410 joined at a head portion 420. The legs 410 form a clip opening 430 at an opposite end of the head portion 420. Each arm 440 is coupled to each leg 410 such that the pair of arms 440 are coupled to the pair of legs 410 adjacent to the head portion 420. The arms 440 move substantially independently from the pair of legs 410. The arms 440 further include projections 460 pointing toward each other creating the clip opening 430 and to form a frictional opening 450 upon insertion or withdrawal of the post 40 such that the post 40 causes a non-compressive force between the arms 440 when the post 40 is withdrawn. According to one embodiment, the head portion 420 is tapered to guide the clips 50 into the slot 82 of chassis 80.

The clip 50 may be made of: Polypropylene, glass fill, acetal, plastic, vinyl, rubber, plastisol, plastic, acetal, polyacetal, polyoxymethylene, nylon, fiberglass and carbon fiber and/or Acrylonitrile butadiene styrene (ABS) or any suitable material.

A body panel such as a headliner, not shown, may be attached to a magnetic fastener 300 via coupler 310. For example, coupler 310 may further include inner rib 320 and outer rib 330 coupled by a shaft 340. Inner rib 320, outer rib 330 and shaft 340 may be sized to suitably engage a panel mounted tower with a side-slot in a body panel such as a headliner. As is understood by one skilled in the art, the inner rib 320, outer rib 330 and shaft 340 would engage a corresponding side-slot in a tower of the body panel. The inner rib 320 and outer rib 330 may be any suitable shape such as square, oval, round, rectangular. The inner rib 320 and outer rib 330 may have any suitable size and relative spacing between inner rib 320 and outer rib 330 via appropriately spacing shaft 340.

According to an alternative embodiment, the coupler 310 may further comprise base holes 500 shown in FIG. 5 of co-pending application Ser. No. 12/464,867. The base holes 500 permit attachment to the body panel by applying glue or any suitable fastener. Tapered holes that have a larger diameter on the top side of the coupler 310 (closest to the magnet coupler 350) than on the bottom side (mating with the body panel) filled with glue will further provide a mechanical connection as well as the adhesive connection as a result of the adhesive properties of the glue. The body panel assembly thus comprises a body panel attached to the magnetic fastener 300 attached via side slot to mate with coupler 310, glue or other suitable fastener such as a screw, bolt, rivet or any suitable fastener to attach the body panel to the magnetic fastener 300.

Alternatively, coupler 310 may include any attachment mechanism suitable to couple or attach to a body panel such as a nut, bolt, weld stud, thread stud, button head, clip, panel clip, retainer, panel mounted receptacle, retainer washer, or rivet, cable tie, wire clip, hook and loop fastener (Velcro®), sticky tape, double faced tape, spike array, or any suitable combination. The corresponding mounting structure thus would attach to the base attachment mechanism with a corresponding attachment mechanism.

According to one embodiment, the magnetic fastener 300 further comprises a holder 350 and a magnet 370 not shown but illustrated in parent application Ser. No. 12/464,867. The magnetic fastener 300 may be a single piece (i.e. a magnet 370 without a holder) or multi-piece device. Although the magnetic fastener 300 is shown as round, any suitable shape may be used including oval, square, rectangular, triangular or polygon.

An optional umbrella 360 is positioned between the coupler 310 and the magnet holder 350 and is also described in parent application Ser. No. 12/464,867. The umbrella 360 is operative to flex or compress appropriately to permit the coupler 310 and magnet holder 350 to pivot relative to each other. The magnetic fastener 300 adapts to different surface curvatures and thicknesses. The magnetic fastener 300 is operative for blind attachment into a structure 80, such as a vehicle chassis i.e. door frame, chassis or roof. An extended shaft 340 provides additional height for suitable applications. According to one embodiment, the umbrella 360 is made of rubber, plastic, metal, carbon fiber or any material that is flexible enough to support the coupler 310 and holder 350 and to flex. According to an alternative embodiment, the umbrella 360 is foam suitable to allow the magnet holder 350 to pivot. As shown in the embodiments of the figures, the optional umbrella 360 may be flush with the coupler 310, however the umbrella 360 may be thicker. According to this embodiment, there is relatively little or no open area between the coupler 310 and the holder 350. This may be suitable for short height applications where there is little or a relatively short distance between the chassis and body panel, i.e. headliner and roof. Thus a body panel assembly may include magnetic fasteners of various heights. For example the magnetic fasteners of various heights may be used where the distance between the headliner and roof varies.

According to another embodiment, a boss is welded to form a T-shaped head to secure the magnet 370 to the magnetic holder 350, as is also described in the above referenced parent application. As the umbrella 350 flexes, the magnetic fastener 300 may pivot about the boss for example at an angle to allow the magnetic fastener 300 to adapt to different surface curvatures while securely fastened to the body panel. According to one embodiment, the magnet 370 does not engage the boss. Thus, the magnet 370 and optional umbrella 360 support structure adapts to different attachment lengths, variations of sheet metal roundness and thicknesses thus allowing the magnet fastener 310 and assembly 20 to adjust to different depths while pivoting and maintaining a high level of extraction force. During installation, the assembly 20 continuously adapts to variations in curvature and dimensions of the vehicle roof and/or in the body or headliner panel. Thus, only a single style assembly 20 and magnetic fastener 300 need be used with a vehicle or application even if different attachment lengths are required at different attachment points or even if the curvature or thickness of the sheet metal varies substantially. The magnetic bracket assemblies 20 securely fasten the headliner to the roof and provide long reliable life.

The magnetic bracket assembly 10 may be pre-assembled by attaching the bracket 10 to clips 50 in preparation for insertion into the vehicle chassis 80. Similarly, the magnetic fastener clip 300 may be pre-assembled by attaching coupler 310 of the magnetic fastener clip 300 to a body panel as described above, such as a headliner, to form a body panel assembly (not shown).

The body panel assembly is operatively inserted as a single unit and aligns with the structure, such as a vehicle chassis, pillar, roof, instrument panel or frame to form a vehicle with the magnetic clip. The magnetic fastener 300 adapts to different chassis curvatures such that an angle between the magnet holder 350 and the coupler 310 is operative to vary continuously.

The body panel may be constructed from plastic or from any suitable material such as plastic, vinyl, cloth, wood, steel, aluminum, magnesium, carbon fiber or any suitable material.

FIG. 6 is a bottom view of the magnetic bracket assembly 20 inserted into a vehicle chassis 80. According to one embodiment, the posts 40 may have any suitable shape, such as for example: ratchets, tapered, depressions, straight, curved or any suitable shape.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A magnetic bracket for attachment to a non-magnetic part of a vehicle chassis comprising:
a base having a magnetic portion operable to attach to a magnetic fastener and to align with the non-magnetic part of a vehicle chassis in response to the magnetic attraction between the magnetic fastener and the magnetic portion; and
at least two posts at opposite ends of the base, the posts bend upwards from the base to guide the posts upon insertion into at least two clips are operable to attach at the posts and to the non-magnetic part,
wherein the posts have a rectangular notch opening between the base and at least one post such that the posts bend precisely.

2. The magnetic bracket of claim 1 wherein the magnetic portion has a round, circular, semi circular, rectangular or curved shape.

3. The magnetic bracket of claim 1 wherein
the clip comprises of at least one of: Polypropylene, glass fill, acetal, plastic, vinyl, rubber, plastisol, polyacetal, polyoxymethylene, nylon, fiberglass and carbon fiber and Acrylonitrile butadiene styrene (ABS) and
the magnetic bracket comprises at least one of: steel, a steel alloy, iron, and a magnetic material.

4. The magnetic bracket of claim 1 wherein the magnetic fastener further comprises:
a holder,
an umbrella or foam, attached to the holder; and
a magnet attached to the holder opposite the umbrella or foam;
wherein the magnetic fastener is removably coupled to the magnetic portion on a side of the base opposite the clips.

5. The magnetic bracket clip of claim 1 wherein the at least two clips further comprise:
a pair of laterally offset legs joined at a head portion, wherein the legs form a clip opening at an opposite end of the head portion; and
a pair of arms coupled to the pair of legs adjacent to the head portion such that the pair of arms move substantially independently from the pair of legs, wherein the arms project toward the clip opening to form a frictional opening and to permit insertion or withdrawal of the post such that the post causes a non-compressive force between the arms when the post is withdrawn.

6. The magnetic bracket of claim 5 wherein at least one of: an end of the post is tapered and the head portion of the clip is tapered.

7. The magnetic bracket of claim 5 wherein the clip further includes a projection located at the end of each corresponding arm, such that the projections point to each other to create the frictional opening.

8. The magnetic bracket of claim 5 wherein at least one of:
at least one of the legs passes through a notch opening of the bracket when the clip is inserted into the post, and
the pair of arms are substantially flush with the legs such that the arms engage a first engagement structure when the post is withdrawal.

9. The magnetic bracket of claim 5 further comprising at least one of: a depressed portion on the end of the post, an inner part of a notch opening on the post, a depressed portion on at least one arm and a depressed portion on at least one leg.

10. A magnetic bracket assembly for attachment to a non-magnetic part of a vehicle chassis comprising:
a magnetic bracket comprising:
a base having a magnetic portion;
at least two posts at opposite ends of the base, the posts bend upwards from the base to guide the posts upon insertion into at least two clips operable to attach at the posts at opposite ends of the base, wherein the clips are operably clipped into a slot of a non-magnetic part of a vehicle chassis, wherein the posts have a rectangular notch opening between the base and at least one post such that the posts bend precisely; and
a magnetic fastener having one end removably attached to a body panel and having a magnetic side opposite the one side that is magnetically attached to the magnetic portion.

11. The magnetic bracket assembly of claim 10 wherein the magnetic portion has a round, circular, semicircular, rectangular or curved shape and aligns with the magnetic fastener.

12. The magnetic bracket assembly of claim 10 wherein the at least two clips further comprise:
a pair of laterally offset legs joined at a head portion, wherein the legs form a clip opening at an opposite end of the head portion; and
a pair of arms coupled to the pair of legs adjacent to the head portion such that the pair of arms move substantially independently from the pair of legs, wherein the arms project toward the clip opening to form a frictional opening and to permit insertion or withdrawal of the post such that the post causes a non-compressive force between the arms when the post is withdrawn.

13. The magnetic bracket assembly of claim 12 wherein the clip further includes a projection located at the end of each corresponding arm, such that the projections point to each other to create the frictional opening.

14. A method of assembling a magnetic bracket for attachment to a non-magnetic part of a vehicle chassis comprising:
forming two posts at opposite ends bending upwards from a base of the magnetic bracket;
inserting at least two clips into posts at opposite ends of the base of the magnetic bracket and to the non-magnetic part; and
removably inserting the clips into a slot of a non-magnetic part of the vehicle chassis.

15. The method of claim 14 further comprising:
attaching a body panel attached to a magnet by magnetically and removably attaching the magnet with the base.

16. The method of claim 14 further comprising:
aligning the magnetic fastener with the non-magnetic part of a vehicle chassis in response to the magnetic attraction between the magnetic fastener and the base.

* * * * *